H. HESS.
ANTIFRICTION BEARING.
APPLICATION FILED DEC. 29, 1911.
1,116,887.
Patented Nov. 10, 1914
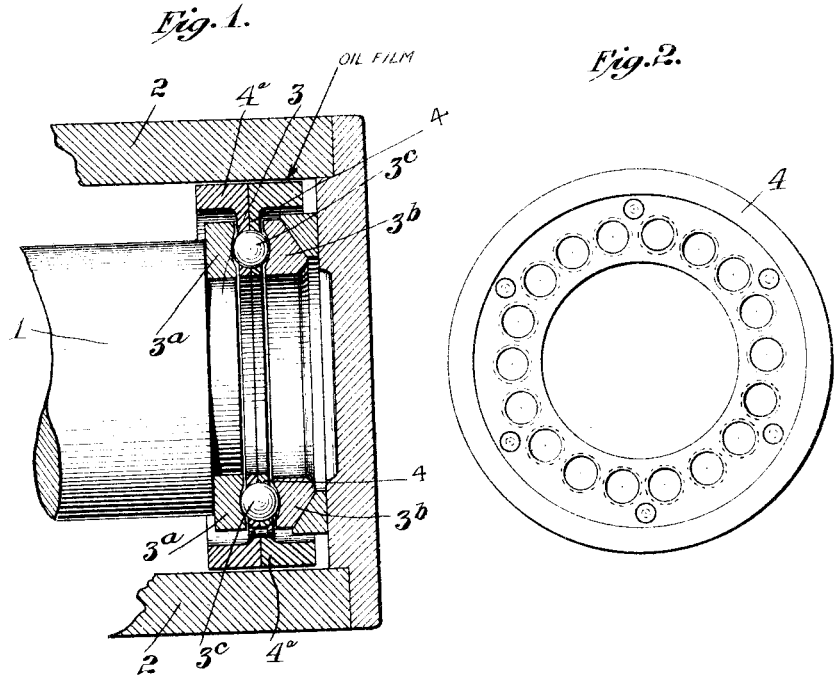
Inventor:
Henry Hess

UNITED STATES PATENT OFFICE.

HENRY HESS, OF PHILADELPHIA, PENNSYLVANIA, ASSIGNOR TO THE HESS BRIGHT MANUFACTURING COMPANY, A CORPORATION OF DELAWARE.

ANTIFRICTION-BEARING.

1,116,887.     Specification of Letters Patent.     Patented Nov. 10, 1914.

Application filed December 29, 1911. Serial No. 668,402.

*To all whom it may concern:*

Be it known that I, HENRY HESS, a citizen of the United States, residing at Philadelphia, in the county of Philadelphia and State of Pennsylvania, have invented certain new and useful Improvements in Antifriction-Bearings, of which the following is a specification, reference being had therein to the accompanying drawing.

This invention relates to antifriction bearings, and has reference more particularly to thrust bearings employed in connection with horizontally-disposed relatively-rotatable parts, such as shafts and their housings. In the use of thrust bearings for this purpose, it is customary to employ separating means for the rolling elements of the bearings, which separating means are commonly in the form of a plate or cage with seats or sockets in which the rolling elements revolve, and which plate is arranged between the relatively rotating parts so as to rotate between them as the rolling elements are individually revolved by contact with said parts. In practice more or less trouble results, due to the cage riding on the shaft or on the housing; or due to the weight of the cage having to be carried by the rolling elements when not traveling on the shaft or housing. This trouble becomes more pronounced when there is an occasional relief of the load or recession of one of the relatively rotating parts from the other, allowing the cage with the rolling elements to drop, which latter are forced up when the parts approach each other as the load comes on again. The accidental strains due to these objectionable actions are apt to be very severe and are decidedly injurious to the bearing. If, in order to prevent the lateral shifting of the cage and rolling elements as described, the cage is allowed to ride on either the shaft or housing, more or less injurious wear will occur at this point, particularly when the parts are driven at high speeds. In order to obviate these objectionable actions, I provide the cage in accordance with my invention, either where it surrounds the shaft or where it fits within the housing, with an extended portion arranged in close proximity to the housing or shaft as the case may be, so as to give effectual support to the cage and prevent the same from injurious wear or from lateral shifting. In its preferred and more specific form, the extension on the cage is in the form of a cylinder and is accurately turned or ground to leave only a small clearance between it and the supporting part, as a result of which construction an oil film will be formed which will sustain the cage in its proper position and free from injurious wear.

In the accompanying drawings I have shown my improved cage as being supported by a fixed housing surrounding a rotary part or shaft, but it will be understood that the invention contemplates as well the formation of the cage so that it will coöperate with and be supported by the shaft; and it will be further understood that my invention is not limited to any particular form or construction of the parts, except in so far as such limitations are specified in the claims.

In the accompanying drawings: Figure 1 is a longitudinal sectional elevation of a shaft and its casing, shown an interposed antifriction bearing having my invention embodied therein. Fig. 2 is an elevation of the cage or separator removed from the bearing.

In the particular embodiment of my invention shown, 1 represents a rotary shaft, and 2 a fixed housing surrounding the shaft.

3 represents an antifriction device in the form of a thrust bearing comprising a thrust plate $3^a$ carried by the shaft, a thrust plate $3^b$ sustained by the housing, and a series of interposed rolling elements $3^c$ in the form of friction balls, which travel in grooves in the adjacent faces of the plates $3^a$ and $3^b$. The friction balls are mounted in sockets or openings in a circular plate or disk 4, loosely surrounding the shaft and arranged between the thrust plates, the disk serving to maintain the rolling elements in spaced relation, and forming a cage for the same, which cage is rotatable as a whole around the shaft's axis, as the balls are rotated individually in the cage by the contact of the thrust plate $3^a$ with the balls.

The foregoing parts may be of the usual and ordinary construction, and constitute a well-known form of thrust bearing by which the end thrusts of the shaft are received and transmitted to the surrounding housing.

In carrying out my invention in its preferred form, I form on the periphery of the cage, a longitudinal cylindrical extension $4^a$, which projects in opposite directions from the plane of the cage, a considerable distance beyond the ball diameters, so as to form an extended cylindrical shell, the outer surface of which fits loosely but closely within the housing 2 and receives effectual support therefrom. This cylindrical extension is preferably accurately turned or ground on its exterior surface and is of such diameter relative to the housing as to leave only a small clearance between it and the housing, so that its fit within the housing will be such as to cause the formation of an oil film between the housing and the external cylindrical surface of the cage. As a result of the construction described, the cage will be effectively and evenly supported, and therefore prevented from shifting laterally out of its true position with reference to the ball tracks on the thrust plates. Furthermore, the broad and extended cylindrical supporting surface on the cage, by coöperation with the housing, causes the cage to travel around in an even and uniform manner, and free from injurious friction or wear. The provision of the oil film, enables the cylindrical surface of the cage to move in very close proximity to the surrounding surface of the housing without danger of seizing, and with a freedom of motion which will not interfere with the proper operation of the bearing as a whole.

While in the drawings the relatively moving parts are shown as horizontally-disposed, and while in the claims these parts are so referred to, it will be understood that the substantial horizontal disposition of the relatively moving parts would be within the scope of my invention, or in fact, any disposition of the parts from the horizontal, which would bring about the action of gravity in its tendency to shift the cage laterally.

Having thus described my invention, what I claim is:

The combination of two horizontally disposed parts, one rotatable relatively to the other and one part being exterior to the other and provided with an internal smooth cylindrical surface, a thrust bearing disposed between said parts and comprising opposing casing members formed with ball grooves, and interposed rolling elements traveling in said grooves, and a separating device for the rolling elements, comprising a plate disposed between the casing members of the bearing and formed with openings in which the rolling elements are seated, said plate being provided at its peripheral edge with annular flanges extending in opposite directions for a considerable distance beyond the rolling elements, the outer faces of said flanges forming a smooth, continuous cylindrical extended bearing surface fitting in such immediate proximity to said interior cylindrical surface as to admit of the formation of an oil film between said surface.

In testimony whereof I affix my signature in presence of two witnesses.

HENRY HESS.

Witnesses:
C. P. McCalla,
C. S. Butler.